United States Patent
Tsakalakos et al.

(10) Patent No.: US 8,129,894 B2
(45) Date of Patent: Mar. 6, 2012

(54) CARBIDE NANOSTRUCTURES AND METHODS FOR MAKING SAME

(75) Inventors: Loucas Tsakalakos, Niskayuna, NY (US); Sung Su Han, Niskayuna, NY (US); John Aibangbee Osaheni, Clifton Park, NY (US); Vanita Mani, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1109 days.

(21) Appl. No.: 11/940,488

(22) Filed: Nov. 15, 2007

(65) Prior Publication Data

US 2010/0283033 A1   Nov. 11, 2010

Related U.S. Application Data

(62) Division of application No. 10/986,599, filed on Nov. 10, 2004, now Pat. No. 7,318,763.

(51) Int. Cl.
*H01J 1/62*    (2006.01)

(52) U.S. Cl. ......... 313/495; 313/309; 313/336; 313/351
(58) Field of Classification Search .......... 313/495–497, 313/336, 351, 309, 310; 445/49–51
See application file for complete search history.

(56) References Cited

U.S. PATENT DOCUMENTS

| | | | | |
|---|---|---|---|---|
| 6,504,292 | B1 * | 1/2003 | Choi et al. | 313/310 |
| 6,975,063 | B2 * | 12/2005 | Mao et al. | 313/309 |
| 7,053,538 | B1 * | 5/2006 | Ha et al. | 313/309 |
| 7,615,917 | B2 * | 11/2009 | Choi et al. | 313/495 |

* cited by examiner

*Primary Examiner* — Joseph L Williams
(74) *Attorney, Agent, or Firm* — Paul J. DiConza

(57) ABSTRACT

A structure includes a substrate and a metallized carbon nanostructure extending from a portion of the substrate. In a method of making a metallized carbon nanostructure, at least one carbon structure formed on a substrate is placed in a furnace. A metallic vapor is applied to the carbon nanostructure at a preselected temperature for a preselected period of time so that a metallized nanostructure forms about the carbon nanostructure.

16 Claims, 3 Drawing Sheets

CARBIDE NANOSTRUCTURES AND METHODS FOR MAKING SAME

CROSS REFERENCE TO RELATED APPLICATIONS

This application is a Division of U.S. patent application Ser. No. 10/986,599, filed Nov. 10, 2004, entitled CARBIDE NANOSTRUCTURES AND METHODS FOR MAKING SAME, which is herein incorporated by reference.

FEDERALLY SPONSORED RESEARCH

The United States Government may have certain rights in this invention pursuant to Cooperative Agreement No. 70NANB2H3030, awarded by the National Institute of Standards and Technology, United States Department of Commerce.

BACKGROUND

1. Field of the Invention

The invention relates to nano-scale structures and, more specifically, to a method of making nano-structures by carbon nanotube confined reactions.

2. Description of the Prior Art

Field emission devices (gated or ungated) have applications in X-ray imaging systems, displays, electronics, microwave amplifiers, fluorescent lamp cathodes, gas discharge tubes, and many other electrical systems. Other applications for field emission devices include sensors, photonic bandgap devices, and wide bandgap semiconductor devices.

Carbon nanotubes are currently being researched as electron emission sources in, for example, flat panel field emission display applications, microwave power amplifier applications, transistor applications and electron-beam lithography applications. The carbon nanotubes are typically synthesized through an arc discharge method, a chemical vapor deposition (CVD) method or a laser ablation method. Carbon nanotubes offer the advantage of having high aspect ratios which increases the field enhancement factor and therefore the extraction of electrons at relatively low electric fields. Carbon nanotubes, however, exhibit a fairly high work function, and are prone to damage under typical operating conditions, limiting the life and effectiveness of the devices. What is needed, therefore, is a material more robust and with a lower work function than carbon, but with a cylindrical geometry and diameters in the 10-800 nm range.

Metal carbide nanorods are candidate materials for use in field emission gated devices, which have applications in stationary computed tomography systems, displays, etc. A fabrication procedure is required that allows for seamless integration with gated device structures as well as control of the lateral density of nanorods so that electric field shielding does not occur. Carbide materials may be preferred due to their chemical stability, mechanical hardness and strength, high electrical conductivity, and relatively low work function. These characteristics make them particularly suited to the environment that may be found in a computed tomography system and the like. Such materials may also be important in superconducting nanodevices, optoelectronic nanodevices, display systems, lighting systems and other similar systems.

The main approach to synthesizing carbide nanorods to date has been to use a carbon nanotube (CNT) as a template on which a reaction is carried out between the CNT and a metal, metal oxide, or metal iodide in vapor form to produce metal carbide nanorods. This process is typically done in a vacuum-sealed tube with reaction times being more than 24 hours. However, demonstration of CNT conversion on a substrate such as silicon or in a device structure is not known.

Therefore, there is a need for a system that generates metallized carbon nanostructures from a substrate in a relatively short period of time.

There is also a need for a system that grows elongated nanostructures in situ directly in device structures.

SUMMARY OF THE INVENTION

The disadvantages of the prior art are overcome by the present invention, which, in one aspect, is a structure that includes a substrate and a metallized carbon nano-structure extending from a portion of the substrate.

In another aspect, the invention is a field emitter that includes a conductive substrate, an insulating layer, a conductive gate layer, and at least one metallized carbon nano-structure. The conductive substrate has a top surface. The insulating layer is disposed adjacent to the top surface of the conductive layer and defines a passage that exposes a portion of the top surface of the substrate. The conductive gate layer is disposed adjacent to the insulating layer and defines a hole that is in substantial alignment with the passage defined by the insulating layer. The metallized carbon nano-structure extends from the portion of the top layer of the substrate through at least a portion of the passage defined by the insulating layer.

In another aspect, the invention is a method of making a metallized carbon nanostructure, in which at least one carbon structure formed on a substrate is placed in a furnace. A metallic vapor is applied to the carbon nanostructure at a preselected temperature for a preselected period of time so that a metallized nanostructure forms about the carbon nanostructure.

In yet another aspect, the invention is a method of making a field emitter, in which an insulating layer is placed on a conductive substrate. A conductive gate layer is placed on the insulating layer, opposite the conductive substrate. An opening is defined in the conductive gate layer and the insulating layer, so as to expose a portion of the conductive substrate. At least one carbon nanostructure is grown on the exposed portion of the substrate. A metal vapor is applied to the carbon nanotube so as to form a metallized carbon nanostructure in the opening.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
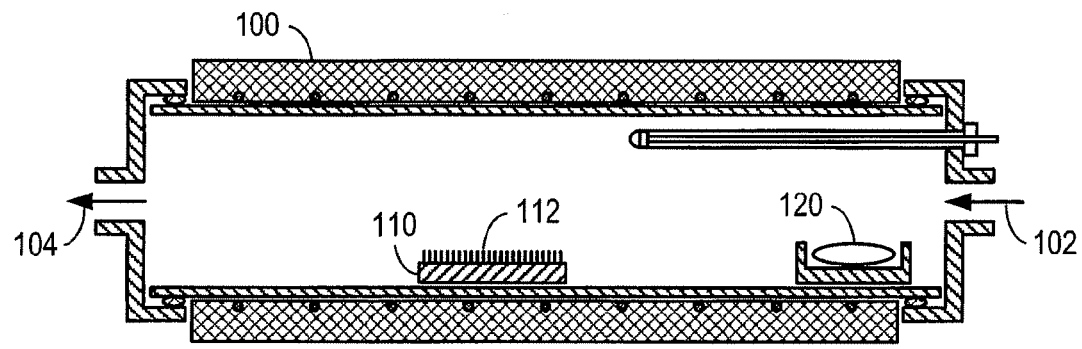
FIG. 1 is a schematic view of a tube furnace used in a method according to one illustrative embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Unless otherwise specified herein, the drawings are not necessarily drawn to scale.

Also, as used herein, nanostructure means a structure having a narrowest dimension diameter of less than 800 nanometers (nm). as used herein, "metalized carbon nanostructures" include metal carbide nanostructures and metal carbide structures with carbon nanotube cores.

Metal carbide nanostructures are made as disclosed below. Such nanostructures may be used to form field emitting devices. Initially carbon nanotubes, either grown from a substrate through methods known to the art (such as by an in situ catalyst-based carbon nanotube procedure) or deposited onto a substrate in the form of a paste, are exposed to a metal vapor and form metallized nanostructures. Different types of carbon nanotubes (e.g., single-walled nanotubes, double-walled nanotubes and multi-walled nanotubes) may be employed. The type of nanotube employed will affect the properties of the resulting nanostructures.

In one example of a method of making metallized carbon nanostructures, as shown in FIG. 1, carbon nanotubes 112, or other carbon nanostructures, disposed on a substrate 110 are placed in an furnace 100 (such as a quartz tube furnace), along with a metal precursor 120. The metal precursor 120 could be a metal, such as a transition metal, or an oxide of a metal. Examples of suitable metals include: molybdenum, tungsten, zirconium, hafnium, silicon, niobium, titanium, and tantalum. Combinations of these metals, or oxides of these metals, or iodides, bromides, organometallics, etc. employing these metals may also give desirable results. The use of a metal oxide as the metal precursor 120 may be desirable in some embodiments because the resulting vapor pressure may be higher than with a non-oxidized metal.

The furnace 100 is heated to a preselected temperature for a preselected period of time so that a least a portion of the metal precursor 120 vaporizes and metallized nanostructures form about the carbon nanostructures 112 as part of a chemical vapor deposition process. A gas is used to carry the metal vapor to the carbon nanotubes 112.

In one illustrative example, an inert gas (e.g., argon) at a gas flow rate of between 300 sccm and 1000 sccm, is forced to flow through the furnace at a predetermined gas flow rate, entering at a gas intake 102 and flowing out through an exit 104. Alternatively, a combination of an inert gas and a reducing gas may be used. For example, the inert gas could include argon applied at a gas flow rate of between 300 sccm and 1000 sccm, and the reducing gas could include hydrogen at a gas flow rate that comprises between 1 sccm and 300 sccm. Adding a reducing gas reduces the effects of residual oxygen in the furnace 100 associated with some precursors. In one exemplary embodiment of the method, the pressure inside the furnace 100 is approximately one atmosphere, the temperature is maintained in a range from about 800 K to about 1200 K and the metallized carbon nanostructures are formed in about one to four hours. In this embodiment, using molybdenum oxide as the metal precursor, the following reaction takes place:

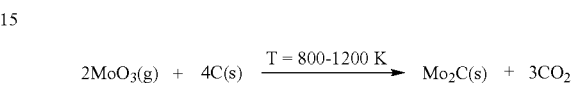

$$2MoO_3(g) + 4C(s) \xrightarrow{T = 800\text{-}1200 \text{ K}} Mo_2C(s) + 3CO_2$$

Figure 2A:
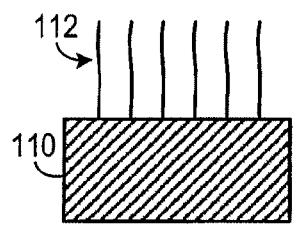
FIG. 2A is a cross-sectional view showing a plurality of carbon nanotubes extending from a substrate.
Figure 2B:
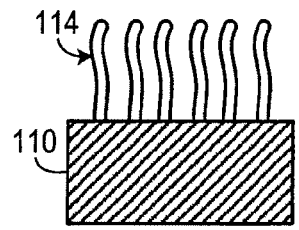
FIG. 2B is a cross-sectional view showing a plurality of metallized carbon nanotubes extending from a substrate.

As shown in FIG. 2A, in executing the above-described method, a plurality of carbon nanotubes 112, which extend from the substrate 110 (which may include a material such as, for example, silicon or silicon carbide), are placed in the furnace. As shown in FIG. 2B, the chemical vapor deposition process transforms the carbon nanotubes into metallized carbon nanostructures 114. Depending on the time and temperature parameters employed, and the type of carbon nanotube used, the metallized carbon nanostructures 114 could be metal carbide throughout, they could have a carbon core with a carbide exterior, or they could have a carbon or carbide core surrounded by a metal sheath.

Selection of the metal influences the work function of the resulting device. The following table lists work functions associated with various metal carbides, and gallium nitride (GaN), which is included for comparison:

| Material | Work Function (eV) |
| --- | --- |
| $Mo_2C$ | 3.8-4.74 |
| WC | 3.6 |
| ZrC | 2.1-4.39 |
| HfC | 2.04-4.15 |
| SiC (0001) | 4.58 |
| NbC | 2.24-4.1 |
| TiC | 2.35-4.12 |
| GaN | 2.9-3.9 |

Figure 3A:
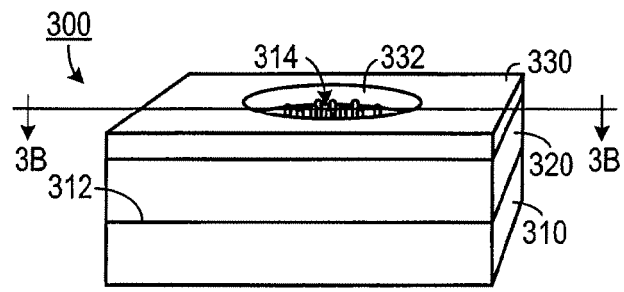
FIG. 3A a perspective view of a field emitter.
Figure 3B:
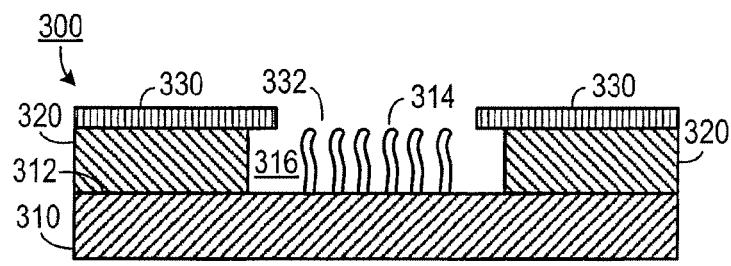
FIG. 3B is a cross-sectional view of the field emitter shown in FIG. 3A, taken along line 3B-3B.

As shown in FIGS. 3A and 3B, a field emitter 300 may be constructed according to the above-disclosed method. The field emitter 300 includes a conductive substrate 310 having a top surface 312. An insulating layer 320 is disposed adjacent to the top surface 312 of the conductive layer 310. The insulating layer 320 defines a passage 316 that exposes a portion of the top surface 312 of the substrate 310. A conductive gate layer 330 is disposed adjacent to the insulating layer 320 and defines a hole 332 that is in substantial alignment with the passage 316 defined by the insulating layer. A plurality of metallized carbon nano-structures 314 extends from the portion of the top layer 312 of the substrate 310 through at least a portion of the passage 316 defined by the insulating layer 320.

Figure 3C:
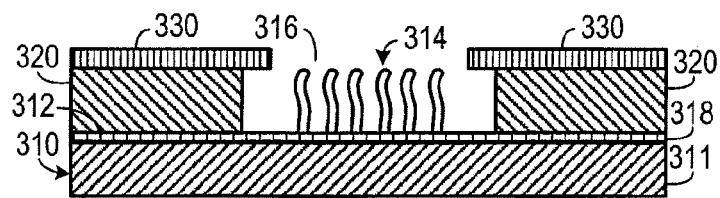
FIG. 3C is a cross-sectional view of a field emitter in which a conductive layer is deposited on the substrate.

As shown in FIG. 3C, the conductive substrate 310 could include a conductive layer 311 and a conductive film 318 (which could include titanium nitride) that acts as a diffusion barrier disposed on the conductive layer 311.

Figure 3D:
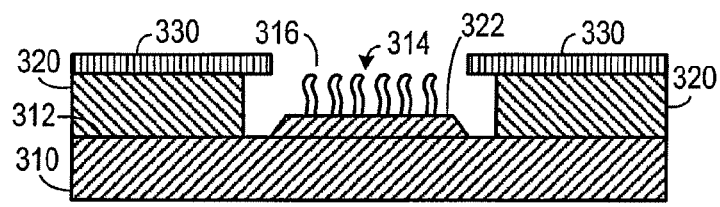
FIG. 3D is a cross-sectional view of a field emitter in which the substrate includes a raised portion.

As shown in FIG. 3D, the substrate 310 may include a raised portion 322 extending from a top surface 312 of the substrate 310. The raised portion 322 could be conical in shape. The metallized carbon nano-structures 314 extend upwardly from the raised portion 322.

Figures 4A, 4B:
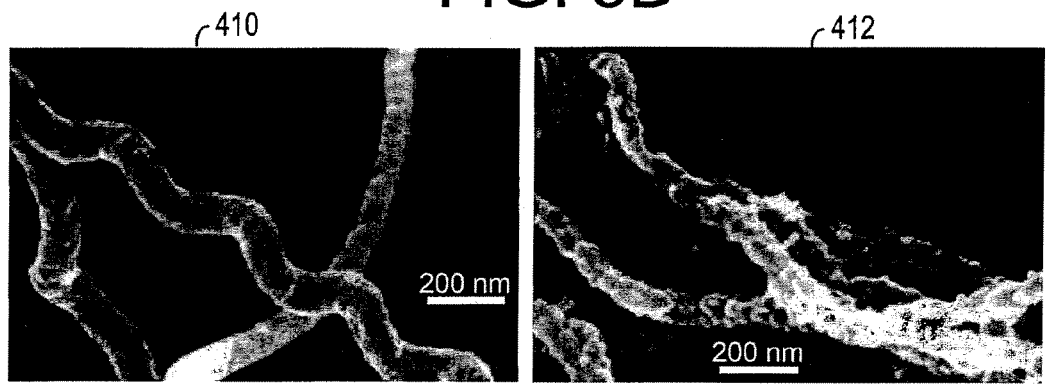
FIG. 4A is a micrograph of a carbon nanotube metallized with an oxide.
FIG. 4B is a micrograph of a carbon nanotube metallized with a metal.

Two micrographs of structures made according to the disclosed method are shown in FIGS. 4A and 4B. These figures show carbide structures in which the following reaction occurred:

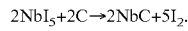

Figure 4C:
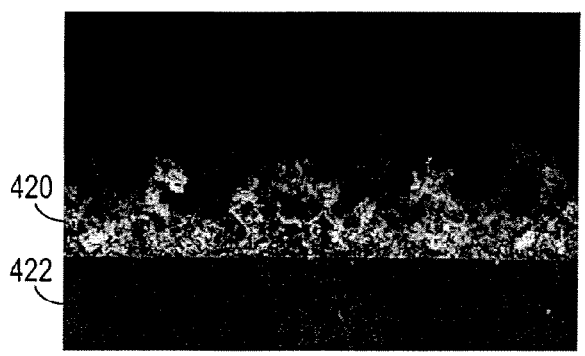
FIG. 4C is a micrograph of a cross section of NbC nanostructures on a substrate.

FIG. 4A shows several metallized carbon nano-structures formed from metallization of carbon nanotubes 412 in which the metal precursor used was a metal iodide. A cross-sectional micrograph of NbC nano-structures 420 on a substrate 422, made according to the method disclosed herein, is shown in FIG. 4C.

Figure 5A:
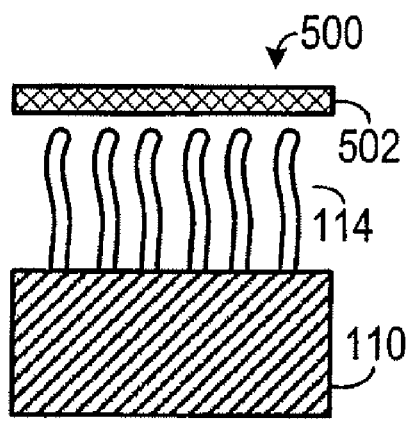
FIG. 5A is a cross-sectional view of a field emitter diode configuration.
Figure 5B:
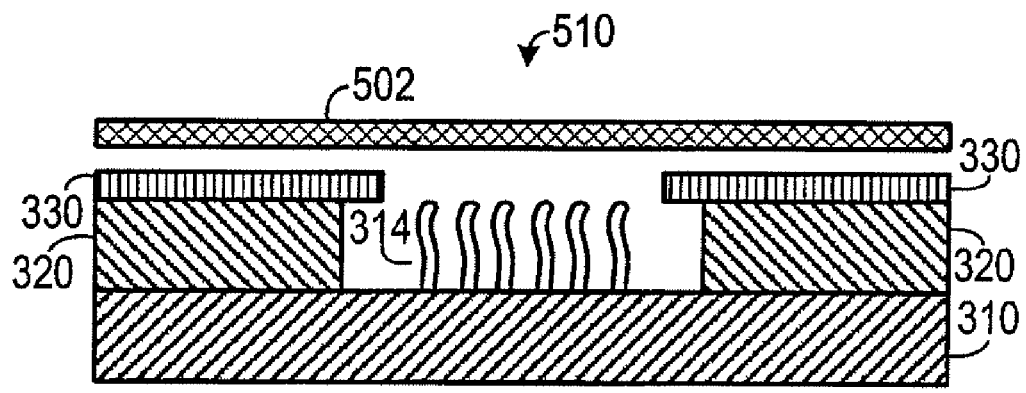
FIG. 5B is a cross-sectional view of a field emitter triode configuration.

As shown in FIGS. 5A and 5B, the addition of an anode 502 may be used in constructing an active electronic device. For example, FIG. 5A shows a diode 500 configuration of a field emitter and FIG. 5B shows a triode 510 configuration of a field emitter. If the anode 502 is coated with a phosphor, then the active device may generate light when a suitable potential is applied. Such devices could be used in imaging systems, such as, for example, x-ray imaging systems, displays, and in lighting systems. Devices made as disclosed herein would result in a lower work function than conventional field emitters and make systems employing field emitters more robust. Also, as is understood, there are many field emitter configurations that could be made according with the present disclosure (e.g., different spatial dispositions of the gate, different materials added to the anode, etc.).

Field emitter 300 may also be serve as a cathode to generate an electron beam in an x-ray generating device, or x-ray source. In this application, a plurality of field emitters 300 are arranged in an array. Electrons emitted by field emitters 300 impinge upon an anode, which in turn emits x-rays. Such an x-ray source may be used in imaging systems, such as computer tomography systems and the like, in medical, inspection, and other radiographic applications. The use of field emitters as x-ray sources are described in U.S. Pat. No. 6,385, 292 by Bruce M. Dunham et al., entitled "Solid-State CT System and Method," issued on May 7, 2002; United States Patent Application Publication US 2002/0085674 by Bruce M. Dunham et al., entitled "Radiography Device with Flat Panel X-Ray Device," filed on Dec. 29, 2000; and United States Patent Application Publication US 2003/0002628 by Colin R. Wilson et al., entitled "Method and System for Generating an Electron Beam in X-Ray Generating Devices," filed on Jun. 27, 2001, the contents of which are incorporated by reference herein in their entirety.

Additional coatings may be applied to the resulting devices to achieve desired properties. For example, certain coatings to the structures (which could be applied in a chemical vapor process or through some other chemical process) could lower the work function of the devices and/or could provide additional protection from ion bombardment. An example of this is coating of the carbide nanostructures by a boron nitride or barium oxide coating.

One typical method of growing carbon nanotubes includes placing a film of a catalyst on a substrate, heating the catalyst so that thin film forms islands, and applying a carbon compound to the islands to grow carbon nanotubes. The catalyst islands may remain at substrate or they may stay at the growing end of the carbon nanotube (or they may even be incorporated within the nanotube).

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A field emitter, comprising:
   a. a conductive substrate, having a top surface;
   b. an insulating layer, disposed adjacent to the top surface of the conductive substrate, the insulating layer defining a passage that exposes a portion of the top surface of the substrate;
   c. a conductive gate layer, disposed adjacent to the insulating layer and defining a hole that is in substantial alignment with the passage defined by the insulating layer; and
   d. at least one metallized carbon nano-structure extending from the portion of the top layer of the substrate through at least a portion of the passage defined by the insulating layer, wherein the metallized carbon nano-structure comprises a carbon core and a metal carbide exterior.

2. The field emitter of claim 1, wherein the conductive substrate comprises silicon.

3. The field emitter of claim 1, wherein the conductive substrate comprises silicon carbide.

4. The field emitter of claim 1, wherein the conductive substrate comprises:
   a. a non-conductive layer; and
   b. a conductive film disposed on the non-conductive layer.

5. The field emitter of claim 4, wherein the non-conductive layer comprises silicon dioxide.

6. The field emitter of claim 5, wherein the field emitter is employed in an imaging system.

7. The field emitter of claim 5, wherein the field emitter is employed in a lighting system.

8. The field emitter of claim 5, wherein the field emitter is employed in a display.

9. The field emitter of claim 1, wherein the substrate includes a raised portion extending from a top surface of the substrate, the metallized carbon nano-structure extending upwardly from the raised portion.

10. The field emitter of claim 9, wherein the raised portion is partially conical in shape.

11. A structure, comprising:
    a substrate; and
    a metallized carbon nano-structure extending from a portion of the substrate, wherein the metallized carbon nano-structure comprises a carbon core and a metal carbide exterior.

12. The structure of claim 11, wherein the metallized carbon nanostructure includes a metal selected from a list consisting of: molybdenum, tungsten, zirconium, hafnium, silicon, niobium, titanium, tantalum, and combinations thereof.

13. The structure of claim 11, wherein the metal carbide exterior is formed from a carbon nano-tube that has reacted with a metal.

14. The structure of claim 11, wherein the metal carbide exterior is formed from a carbon nano-tube that has reacted with a metal oxide.

15. The structure of claim 11, wherein the carbon core transitions into a metal carbide exterior.

16. The structure of claim 11, wherein the structure forms a portion of an x-ray source.

* * * * *